2,888,867

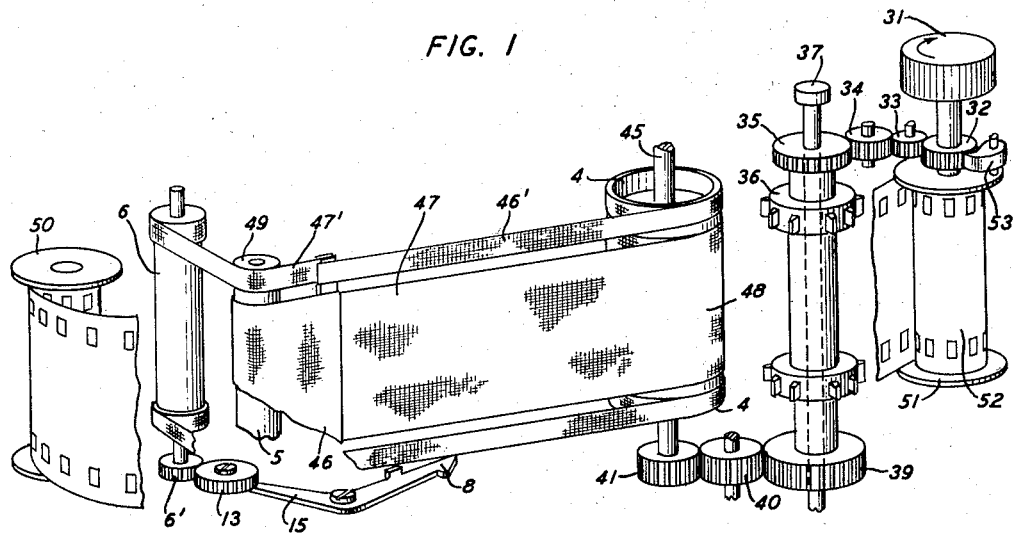
FIG. 1
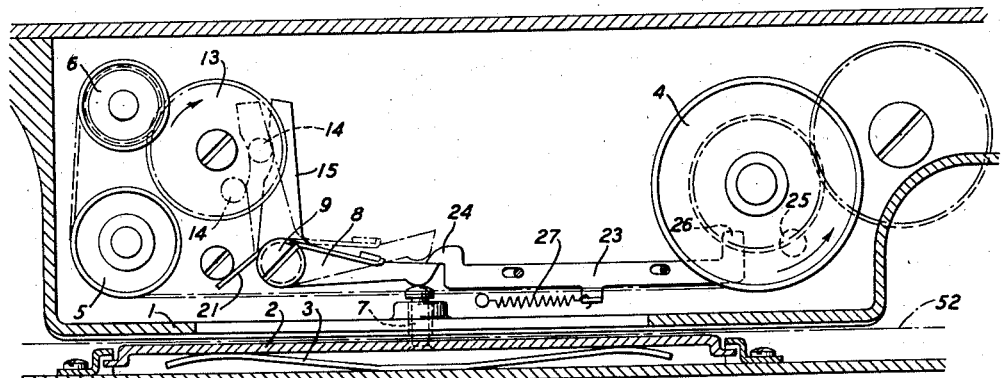
FIG. 2
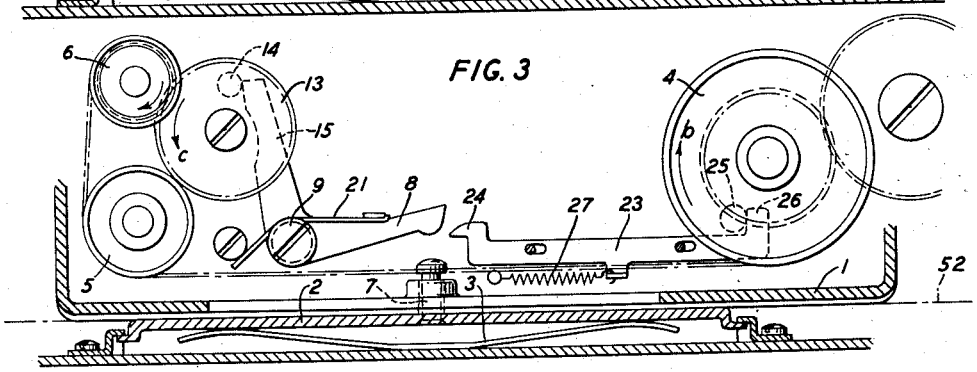
FIG. 3
INVENTOR
HIROSHI SUZUKAWA
BY
ATTORNEY

RELIEVING DEVICE FOR FILM PRESSURE PLATES CONTROLLED BY THE FILM EXPOSURE MECHANISM

Hiroshi Suzukawa, Meguro-Ku, Tokyo, Japan, assignor to Canon Camera Company, Inc., Tokyo, Japan, a corporation of Japan Application August 24, 1955, Serial No. 530,244

Claims priority, application Japan December 20, 1954

3 Claims. (Cl. 95—31)

This invention relates to photographic cameras having focal plane shutters, and more particularly to such cameras having a film pressure plate operatively connected with the first curtain of the shutter to press the film against the exposure aperture when the film is completely wound up. On the last stage of exposure operation of the second curtain the pressure plate is released. The film is thus not pressed by the pressure plate in the course of winding the film while it is pressed at the time of exposure.

The invention, and the details of the structure incorporating the instant invention, will be apparent from the following description of an illustrative embodiment thereof in connection with the appended drawing, in which:

Figure 1 shows the relation between the film winding mechanism and the shutter mechanism and certain portions of the film pressure plate relieving and releasing device of the instant invention;

Figure 2 is a plan view showing when the pressure plate is taken off in the instant embodiment where a release of the pressure plate, or more particularly, the pressing operation is produced in operative connection with the shutter winding drum;

Figure 3 is a plan view showing when film is pressed by the pressure plate.

Referring to the drawing, 1 is the film exposure mask or frame; 2 the pressure plate, and 3 is the pressure spring of the pressure plate. 4 is the shutter winding drum and 5 is the first curtain winding roller with 6 the second curtain winding roller. A pin 7 is provided in the pressure plate 2 at any appropriate position to permit unobstructed transport of the film 52 past the frame. A bell crank 8, to relieve the pressure of pressure plate 2 on the film by depressing the pin 7 against the spring 3 is fixed to a rotatable stub shaft 9. A pin 14 is provided on the rotatable member or gear 13 operatively connected with and to the second curtain winding roller 6 to impart a rotary motion to another arm 15 of bell crank 8.

Figure 2 illustrates the condition of these parts of the instant invention when the shutter completes its exposure operation. The bell crank 8, with its integral arm 15 pushed by pin 14, presses the pin 7 to relieve and press the pressure plate 2 against its spring 3, thereby eliminating the pressing action of the plate against the film 52 with the result that the film maintains and holds itself in its free position. When the shutter winding drum is rotated in the direction of the arrow by operatively connecting it with the film winding mechanism, both the first curtain and the second curtain are simultaneously wound up, thus permitting rotatable member or gear 13 to rotate in the direction of the arrow.

A reciprocable slide or rod 23 is provided to latch the bell crank 8 in the described depressed position of pin 7, so as to press on the top of the bell crank 8 by means of a claw 24 on the lefthand end of the rod 23 to keep them in their engaging or latching position under the tension of a spring 27 anchored at one end to the camera body and at its other end to the slide 23. A projection 25 is provided at the bottom of drum 4, or on a suitable rotatable member affixed to the drum shaft, for the purpose further below explained.

In Figure 1, the film winding knob 31 is fixed to the shaft of gear 32, which gear is provided with a latch member 53 for preventing gear 32 from reverse rotation. A film take-up spool 51 is frictionally affixed about and to the shaft of knob 31 and gear 32, and when knob 31 is rotated in the direction of the arrow, the sprocket 36 is rotated counterclockwise as a unit with gear 32 by the gear train 32, 33, 34 and 35. The film 52, wound on the film supply spool 50 to the opposite end of the camera, passes over the film exposure aperture and mask 1, shown in Figures 2 and 3, and is fed to the take-up spool 51 by the teeth of sprocket 36. The sprocket 36 is connected to gear 39, and when the film is wound, the rotation of gear 39 is transmitted to shutter drum shaft 45 through gears 40 and 41, the curtain winding drum 4 being integral on shaft 45. The first curtain ribbon 46' is wound up on the rotation of shaft 45, and the first curtain 46, connected thereto, is wound moving to the right. Since shaft 45 is connected to the second-curtain winding drum 48 through the prior known shutter speed adjusting device, not shown, the second curtain 47 is wound in association with the movement of the first curtain, when the slit of both curtains 46 and 47 is closed. When the curtain is wound for the requisite length, the gear 40 is latched against rotation in the shutter unwinding direction in well known prior manner. Springs are tensioned within the first-curtain winding roller 5 and the second-curtain winding roller 6, constantly tensioning them to wind the curtains up to the left in Figure 1. However, the curtain so wound and tensioned cannot run down due to the gear 40 being, as stated, latched. As is well known, the second curtain can run down only when the first curtain does so, and dependent upon the first curtain by means of the shutter speed adjustment device. By selecting the appropriate ratio for each gear train, 32, 33, 34 and 35 and 39, 40 and 41, the shutter curtain is completely wound up for the requisite length when one portion of the film is wound and then the gear 40 is locked. The gear 6' affixed to the bottom of the second-curtain winding roller 6 and the rotatable member or gear 13 rotate with the rotation of roller 6 to actuate the two-armed angle lever 15 for controlling the pressure plate 2.

When the shutter release button 37 is depressed, the film having been advanced a frame and the shutter curtain wound up, shaft 38 and gear 39 move downwardly permitting free rotation of gear 39, and the first curtain 46 runs down under the wound up spring tension of the spring within the first-curtain winding roller 5. The second curtain 47 runs down through the shutter speed adjusting device after an interval of the predetermined time by the rotation of shaft 45, and is taken up by the second-curtain winding roller 6, causing gear 13 to rotate driven by the rotation of gear 6'.

On the completion of the above described sequence, the knob 31 may be rewound to initiate anew the same sequence, etc. It should be noted the latch member 53 is provided to prevent the reverse direction rotation of gear 32 so that the curtain will not unwind under the tension of the wound springs in rollers 5 and 6.

Referring again to Figures 2 and 3, at the end of the shutter winding, projection 25 on drum 4 engages a bent portion 26 of the right-hand edge of the reciprocating rod 23 to pull the rod to the right to disengage the claw 24 from the lever 8 with the result that, as shown in Fig. 3, the lever 8, under the tension of return spring 21 biasing it in the counter-clockwise direction disengages pin 7 to permit the pressure plate 2 to bear on, and press against, the film as shown in Figure 3 accordingly. Simultaneously on initiating the exposure operation of the shutter, the projection 25 is rotated in the direction of arrow *b* and the reciprocating rod 23 returns to the left-hand side by the action of a spring 27 so as to become in an engaging position with the top of the lever 8. The lever 8 at the end of the exposure operation of the second curtain is pushed from the position shown in chain line in Fig. 2 to the position shown in full line by the rotation of the pin 14 in the direction of arrow C. Eventually the claw 24 is forced back a distance, against the tension of spring 27 by the curved engaging surfaces of claw 27 and the end of lever 8, sufficient to permit the lever end to clear the claw end, whereupon the action of spring 27 pulls the claw over the lever end and latches them with the pin 7 pressed in opposition to the spring 3 to release the pressure plate from its pressing position against the film.

As noted from the above, this invention is characterized in that by operatively connecting the film pressure plate with the focal plane shutter mechanism, at the end of winding the shutter and film, so that the pressure plate is released to press the film to hold it in position on the focal plane, and at the end of exposure operation the pressure plate is relieved to terminate pressing of the film to keep the film free. Thus the film is pressed only when the film and shutter are wound, while the film is not pressed in the course of other conditions, particularly at the time of winding the film, thereby eliminating the trouble of leaving scratches on the surface of film while at the same time providing minimum resistance in such winding. It will be obvious therefore that this invention is effective in promoting the performance of a miniature camera.

I claim:

1. In a photographic camera having a focal plane shutter consisting of a first and second curtain transported on operation of the shutter winding mechanism and of the exposure mechanism of the camera between a shutter wind-up drum and a first-curtain winding roller and a second-curtain winding roller past the mask of the exposure aperture, the improvement comprising a pressure plate, a first spring adapted to press the portion of the film between the pressure plate and the mask against the apertured mask, a first pin projecting from the pressure plate at a region thereof out of the film path, a two-arm angle lever pivoted on the camera body of which the first arm is adapted to engage the first pin to depress it and the plate against the tension of the first spring away from the film, rotatable means adapted to be rotated by the second-curtain winding roller, a second pin projecting from the rotatable means and so positioned thereon that on operation of the exposure mechanism and in the trailing region of the second-curtain winding roller rotation the second pin engages the second arm of the angle lever to engage the first arm to the first pin and to depress the first pin, a reciprocable elongated slide having a claw formed end at its end the nearer to the angle lever first arm and a first projection at its other end, a second spring biasing the slide toward the first pin and into the path of the one arm of the lever, the end surface of the one arm and the end surface of the claw which engage each other initially on rotation of the angle lever being adapted to slide on each other to move the rod against its biasing second spring until the arm end is below the claw when the biasing second spring moves the claw over the first arm end to latch it in the position of maximum depression of the first pin, and a second projection integral with and so positioned on the bottom of the shutter drum that during the trailing region of the rotation in the shutter winding operation the second projection engages the first projection to move the slide to unlatch the first arm end and release the first pin on completion of the shutter winding operation.

2. In a photographic camera, the improvement according to claim 1 in which the elongated slide is reciprocable in a plane parallel to the focal plane and the two-armed angle lever is pivoted on a shaft perpendicular to the plane of the slide and aligned with the longitudinal axis of the slide.

3. In a photographic camera, the improvement according to claim 1 in which the two-armed lever is biased by a third spring in the rotary direction opposite to that in which the lever is rotated by the engagement between its second arm and the second pin.

References Cited in the file of this patent

UNITED STATES PATENTS

| 2,256,207 | Leitz et al. | Sept. 16, 1941 |
| 2,596,222 | Doyle et al. | May 13, 1952 |

FOREIGN PATENTS

| 573,910 | Great Britain | Dec. 12, 1945 |
| 719,323 | Great Britain | Dec. 1, 1954 |
| 865,214 | France | Feb. 17, 1941 |